United States Patent [19]

Lutz

[11] Patent Number: 4,487,057
[45] Date of Patent: * Dec. 11, 1984

[54] CONTINUOUS SENSE AND LOCATE DEVICE

[75] Inventor: Michael A. Lutz, San Carlos, Calif.

[73] Assignee: Raychem Corporation, Menlo Park, Calif.

[*] Notice: The portion of the term of this patent subsequent to Nov. 30, 1999 has been disclaimed.

[21] Appl. No.: 403,891

[22] Filed: Jul. 30, 1982

Related U.S. Application Data

[63] Continuation of Ser. No. 184,647, Sep. 16, 1980, abandoned, which is a continuation-in-part of Ser. No. 134,354, Mar. 27, 1980, abandoned, which is a continuation-in-part of Ser. No. 88,344, Oct. 26, 1979, abandoned.

[51] Int. Cl.$^3$ .................. G01M 3/04; G01R 31/08
[52] U.S. Cl. ................... 73/40.5 R; 73/724; 73/730; 174/11 R; 324/52
[58] Field of Search ............ 374/111, 114; 73/336.5, 73/40.5 R, 37.5; 338/25, 214; 324/52; 174/11 R, 120 SC, 115; 340/605, 626

[56] References Cited

U.S. PATENT DOCUMENTS

| | | | |
|---|---|---|---|
| 1,329,432 | 2/1920 | Rogers | 324/52 |
| 2,558,929 | 7/1951 | Bunish et al. | 174/120 SC X |
| 2,615,973 | 10/1952 | Heath, Jr. | 73/362 CP X |
| 2,985,870 | 5/1961 | Lindberg, Jr. | 374/111 |
| 3,211,002 | 10/1965 | Franklin | 73/362 CP |
| 3,284,704 | 11/1966 | Lamont | 324/52 |
| 3,295,088 | 12/1966 | Smith | 324/65 R |
| 3,477,019 | 11/1969 | Hartmann | 324/52 X |
| 3,510,762 | 5/1970 | Leslie | 73/342 X |
| 3,564,526 | 2/1971 | Butts | 324/52 X |
| 3,663,742 | 5/1972 | Hasebe et al. | 174/120 SC |
| 3,668,373 | 6/1972 | Laing | 338/25 X |
| 3,705,257 | 12/1972 | Wade | 174/120 SC X |
| 3,735,025 | 5/1973 | Ling et al. | 174/120 SC |
| 3,792,409 | 2/1974 | Smart et al. | 338/214 |
| 3,793,716 | 2/1974 | Smith-Johannsen | 338/214 |
| 3,938,385 | 2/1976 | Horwath | 73/362 R |
| 3,970,863 | 7/1976 | Kishikawa et al. | 200/61.04 X |
| 3,981,181 | 9/1976 | Ochiai | 73/40.5 R |
| 3,983,527 | 9/1976 | Ohsatu et al. | 73/336.5 X |
| 4,020,478 | 4/1977 | Hatfield | 324/65 R |
| 4,029,889 | 6/1977 | Mizuochi | 174/11 R |
| 4,041,771 | 8/1977 | Allan et al. | 324/52 |
| 4,095,174 | 6/1978 | Ishido | 340/605 X |
| 4,103,225 | 7/1978 | Stephens | 324/52 X |
| 4,103,236 | 7/1978 | Stephens | 324/60 CD |
| 4,125,822 | 11/1982 | Perren et al. | 324/65 R |
| 4,143,238 | 3/1979 | Sheth | 174/102 SC |
| 4,175,437 | 11/1979 | Burt | 338/36 X |
| 4,177,376 | 12/1979 | Horsma et al. | 219/505 X |
| 4,189,367 | 2/1980 | Connery et al. | 324/51 X |
| 4,200,973 | 5/1980 | Farkas | 338/214 X |
| 4,206,632 | 6/1980 | Suzuki | 324/52 |
| 4,246,468 | 1/1981 | Horsma | 219/505 X |
| 4,361,799 | 11/1982 | Lutz | 374/114 X |

FOREIGN PATENT DOCUMENTS

| | | | |
|---|---|---|---|
| 653864 | 5/1951 | United Kingdom | 340/596 |
| 848423 | 9/1960 | United Kingdom | 73/40.5 |
| 1520355 | 8/1978 | United Kingdom | 340/596 |

Primary Examiner—Daniel M. Yasich
Attorney, Agent, or Firm—James W. Peterson

[57] ABSTRACT

The invention is the use of a solid conductive polymeric composition, which displays a massive resistance increase upon exposure to an external fault condition, as one plate of a capacitor for a continuous sense and locate device. This resistance increase of the conductive polymeric composition (CPC) decreases the capacitance of the capacitor so as to provide an indication of the fault and its location.

17 Claims, 8 Drawing Figures

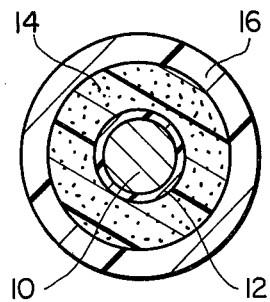
FIG_1
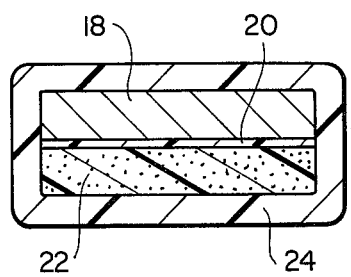
FIG_2
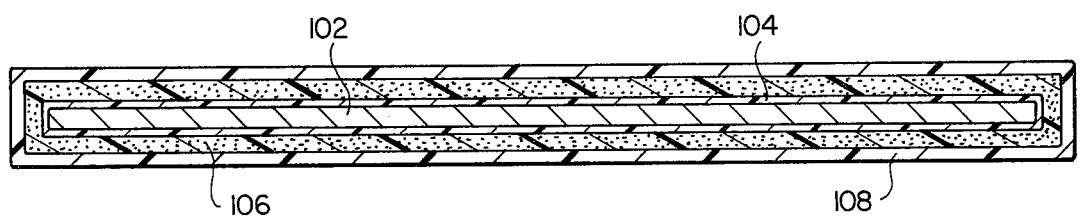
FIG_3
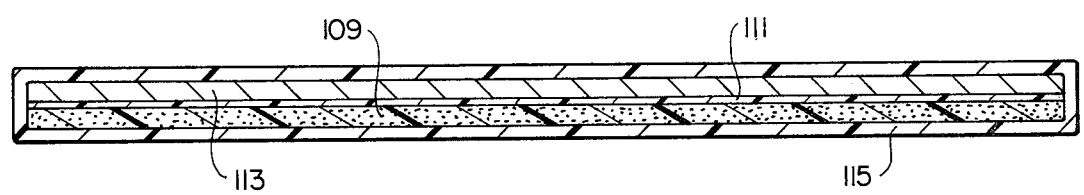
FIG_4

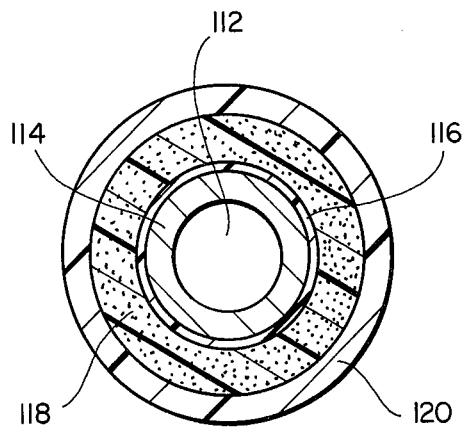
FIG_5
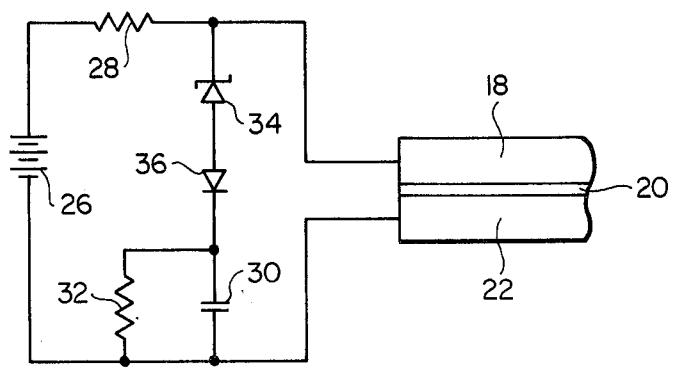
FIG_6

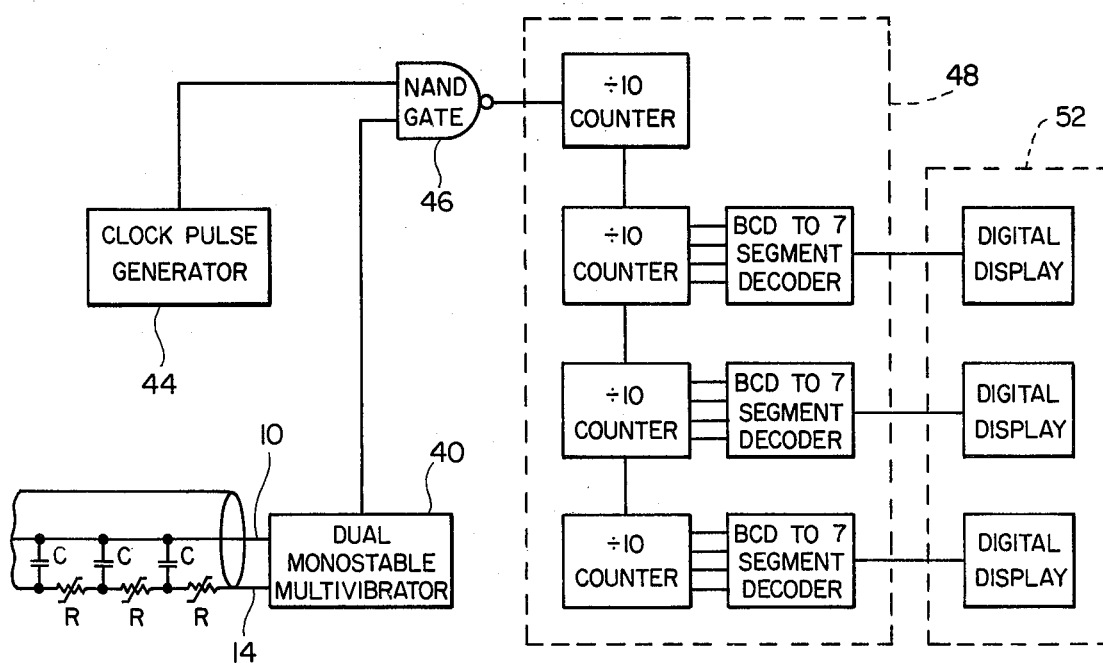
FIG_7
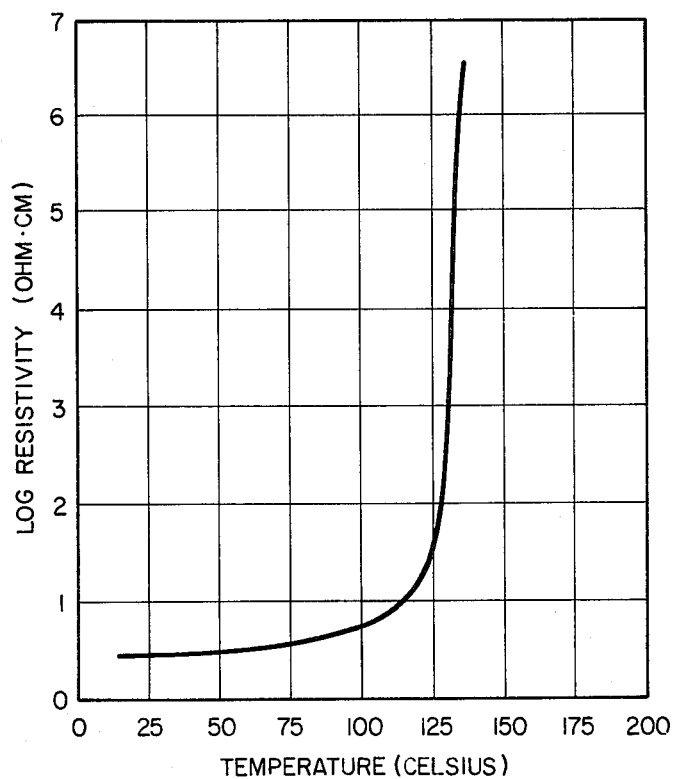
FIG_8

CONTINUOUS SENSE AND LOCATE DEVICE

CROSS REFERENCE TO RELATED APPLICATION

This application is a continuation of my co-pending application, Ser. No. 184,647, filed Sept. 16, 1980, now abandoned, which is, in turn, a continuation-in-part of my co-pending application, Ser. No. 134,354, filed Mar. 27, 1980, now abandoned, which in turn is a continuation-in-part of my co-pending application, Ser. No. 88,344, filed Oct. 26, 1979, now abandoned, the disclosures of which applications are incorporated herein by reference.

BACKGROUND OF THE INVENTION

For the efficient (and, in some cases, safe) operation of many pieces of large apparatus, it is desirable to know when, at some point in the apparatus, a particular parameter (e.g. temperature, concentration of a particular chemical, pressure) exceeds a particular level. It is also desirable to know where in the apparatus the fault condition (i.e. the excessive value of the parameter) exists. Examples include: excessive temperature at some point along a high voltage electrical cable or in a dryer, e.g. for argricultural products; loss of pressure in a pressurized system, e.g. a telephone cable; and leakage of chemicals from pipe lines or tanks. The use of a plurality of individual point sensors for this purpose is so expensive and inconvenient that it is seldom employed.

More specifically, the sensor of the instant invention comprises (1) an electrical conductor, (2) a dielectric, (3) a solid conductive polymeric composition (CPC), and, optionally, (4) a protective layer all in a geometric relationship such that the dielectric separates the electrical conductor from the CPC and the protective layer, if present, separates the CPC from the environment. This geometric arrangement forms a distributed electrical capacitor with approximately constant capacitance per unit length or per unit area. Under normal conditions, the resistance of the CPC is low enough to allow the capacitor to be charged and its full capacitance to be measured. The CPC is designed to increase its resistance under specified fault conditions such as high temperature, mechanical distortion, fluid saturation, etc. The high resistance at the fault location prohibits the capacitor from being charged or discharged at, or beyond, that location. The result is that a decreased capacitance is measured, indicating a fault condition.

In the case of a one dimensional sensor (cable), a fault at any position along the cable length prohibits the cable beyond the fault from being charged or discharged and the ratio of the measured capacitance to the full cable (unfaulted) capacitance stands in the same ratio as the distance to the fault to the full cable length.

In the case of a two dimensional sensor (sheet), a fault in any location will increase the resistance of a certain area of the sheet, thereby reducing the measured capacitance. The ratio of the measured capacitance to the full sheet (unfaulted) capacitance stands in the same ratio as the fault area to the full sheet area. Such a two dimensional sensor could be placed, for example, around a tank where a one dimensional sensor would provide inadequate coverage.

The instant invention is a significant improvement over the prior art in long line or area fault sending and locating for three basic reasons. First, this invention utilizes a solid CPC which is necessary for the construction of practical sensors possessing flexibility, ruggedness, durability and splicability.

Second, the use of a CPC as the sensor makes possible the construction of a standard sensor and electronics package useful for a wide range of monitoring functions. This is possible by selecting different CPC's and/or different protective layer materials: the internal conductor, dielectric, and electronics may remain the same. This allows for manufacturing standardization and cost savings. For example, an over-temperature monitor will require a CPC whose resistance rises sharply with temperature at a critical temperature level. Protective layer material is not critical in this application. A leak detector could use exactly the same conductor, dielectric, and electronics package as the over-temperature monitor, but require a CPC whose resistance rises sharply at a given concentration of specified fluids. The protective layer could be critical in the leak application if sensitivity only to a specific fluid id desired.

Third and most important, the instant invention provides a massive resistance increase for small changes of the parameter of interest. This resistance change combined with a capacitance measuring technique makes it possible to identify faults in an unambiguous way. For example, a temperature sensitive CPC can exhibit four or more orders of magnitude resistance increase over a small temperature range (5°–10° C.) and eight to ten orders are possible. Hydrocarbon sensitive or moisture sensitive CPC's also exhibit substantial resistance increases with minor hydrocarbon concentrations and over ten orders of magnitude with saturation. These large resistance changes are necessary to electrically isolate the fault thereby preventing the fault region from charging or discharging significantly during the measurement time cycle. For a one dimensional (cable) sensor, this ensures that the portion of cable beyond the fault does not contribute to the capacitance between the control end and the fault, thus making precise fault location possible. For a two dimensional (area) sensor, this ensures that the faulted area does not contribute to the measured capacitance, thus making precise measurement of the fault area possible.

OBJECTS OF THE INVENTION

It is a primary object of the instant invention to provide a device that will sense a fault condition and determine its location or area.

It is another object of this invention to provide a fault monitor that is reusable without splicing for a number of physical parameters.

It is yet another object to provide a sensing device that is useful and accurate over great lengths and areas.

It is also an object of the instant invention to provide a monitor whose sensor is relatively insensitive to normal resistance variations due to aging, splicing, or interconnecting.

It is a further object to provide a sensor which is sensitive to different physical parameters and different values of these physical parameters by selection of appropriate CPC's and protective layer materials.

It is still another object to provide a sensor having great flexibility and high endurance to abuse.

SUMMARY OF THE INVENTION

The purpose of this invention is to provide a linear or area monitor which senses whether a specific parameter has exceeded a predetermined value. Depending on the parameter of interest (temperature, pressure, fluid presence or absence, etc.), the sensor may be reusable without replacing that portion exposed to the fault condition. If the sensor is one dimensional such as a cable, fault sensing and location is possible. If the sensor is two dimensional, fault sensing and fault area determination is possible. To accomplish this purpose, the instant invention provides a sensing construction and complementary electronics wherein the sensing construction comprises (1) an electrical conductor, (2) a dielectric, (3) a CPC, and, optionally, (4) a protective layer, all in a geometric relationship such that the dielectric separates the electrical conductor from the CPC and the protective layer, if present, separates the CPC from the environment. The resulting electrical capacitance is measured by the complementary electronics. Capacitance decreases indicate a fault condition due to increased resistance of the CPC and the consequent inability of the full capacitor to charge and discharge during the cycle time of the electronics. The resistance increase of the CPC is due to a specified effect on the CPC at a specific value of the parameter of interest. In the case of a linear sensor, the ratio of the fault capacitance to the normal capacitance can be used to identify the fault location nearest the location of the electronics. In the case of an area sensor, this ratio can be used to indicate the fault area.

DESCRIPTION OF THE DRAWINGS

FIG. 1 illustrates in cross-sectional view, a co-axial, cylindrical sensing cable according to the instant invention.

FIG. 2 illustrates in cross-sectional view, a layered flat sensing cable according to the instant invention.

FIG. 3 illustrates in cross-sectional view, a flat area sensor according to the instant invention.

FIG. 4 illustrates in cross-sectional view, an alternative flat area sensor according to the instant invention.

FIG. 5 illustrates in cross-sectional view, a tubular sensing cable according to the instant invention.

FIG. 6 illustrates in schematic form a capacitance measuring circuit that may be utilized for the sensors illustrated in FIGS. 1, 2, 3, 4, and 5.

FIG. 7 illustrates in block diagram form an alternative measuring circuit that may be utilized for the sensors illustrated in FIGS. 1, 2, 3, 4, and 5.

FIG. 8 is a resistivity versus temperature curve for a CPC that may be utilized in the instant invention.

DESCRIPTION OF THE PREFERRED EMBODIMENT

With continued reference to the drawing, FIG. 1 illustrates in cross-sectional view a cylindrical sensing cable or sensor of the instant invention comprising an inner electrical conductor 10, an intermediate dielectric layer 12 mounted coaxially over said conductor 10, and a layer of solid CPC 14 coaxially encapsulating conductor 10 and layer 12, and finally an outer protective layer 16. In the instant embodiment, the conductor 10 is made from copper and the dielectric layer 12 from an insulating varnish. Other conductors and dielectrics will be apparent to those skilled in the art and the use of such alternate materials is to be considered as coming within the scope of this invention. The solid conductive polymeric composition 14 may be made from a polyolefin or fluoropolymer filled with carbon black, graphite conductive fillers or metal powders.

The concentration of the conductive filler as well as the particle size, shape and surface area influence the electrical resistance of the composition in the "conductive state". A change in the parameter of interest (temperature, fluid level, pressure, change in concentration of a substance) can cause a massive change in electrical resistance, thereby causing the conductive composition to change into the "non-conductive state". This massive change in resistance is the result of a change in the spatial distribution of the conductive fillers.

Protective layer 16 generally comprises a polymer composition which provides electrical insulation between the sensor device and its environment. The composition of protective layer 16 depends upon the nature of the sensing to be accomplished by the sensor device. As an example, if the sensor is to be a temperature sensor, operate continuously at 70° F. and detect and locate temperatures above 120° F., the polymer comprising protective layer 16 could be polyethylene, polypropylene or the like, provided that the polymer has mechanical and electrical integrity at the temperatures above 120° F. Similarly, if the sensor is to be a hydrocarbon fluid sensor to operate continuously at 50° F. and detect and locate the presence of hydrocarbons, the polymer comprising protective layer 16 must be "transparent" to the presence of hydrocarbons, that is, the polymer must allow a sufficient quantity of the fluid to permeate through the sensor to cause the CPC to change from the "conductive state" to the "non-conductive state." Polymer comprising protective layer 16 which allow hydrocarbon sensing could be polyethylene, polypropylene or natural rubber. Detection of the presence of other chemical compounds is also of interest, e.g., water. A typical protective layer for a moisture sensitive sensor would be polyvinyl alcohol. The protective layer may also comprise, for example, a metallic braid and/or other materials which will provide improved mechanical properties for the sensor.

FIG. 2 illustrates in cross-sectional view a flat sensing cable comprising conductor 18, dielectric 20, CPC 22, and protective layer 24. Material considerations are generally the same as for the embodiment shown in FIG. 1. In use, the cable would generally be oriented so that the CPC 22 would be in closest proximity to the body for which fault sensing is desired. Alternatively, a flat cable could be constructed by essentially flattening out the cable of FIG. 1 wherein the CPC would completely surround the dielectric and the conductor providing a flat cable which is orientation independent.

It is within the scope of the invention to utilize multiple sensing cables, similar to those illustrated in FIGS. 1 and 2 in a matrix network to detect a fault condition in two or more dimensions. Specifically, it is possible to have a plurality of sensing cables arranged in an overlapping grid-like network, said cables being attached to appropriate electronics which would read out a fault condition on, for example, X and Y coordinates or, for that matter, a third dimensional Z coordinate if the cables were so arranged.

FIG. 3 illustrates in cross-sectional view a flat two dimensional sheet area sensor comprising conductor 102, dielectric 104, CPC 106, and protective layer 108. Material considerations are generally the same as for the embodiment shown in FIG. 1.

FIG. 4 illustrates in cross-sectional view an alternate flat two dimensional sheet area sensor comprising conductor 109, dielectric 111, CPC 113 and protective layer 115.

FIG. 5 illustrates in cross-sectional view a tubular sensor especially useful where the physical parameter of interest is the presence or absence of pressure of a specific level surrounding the sensor. Tubular space 112 is empty in construction but can be filled with a fluid to a preset pressure, essentially inflating the tubular space of the tube. Flexible metal mesh 114 is bonded to dielectric 116 which is bonded to CPC layer 118 which in turn is bonded to protective layer 120. In operation, space 112 is pressurized such that a fall in pressure outside protective layer 120 below a critical value causes a bulge in the entire structure at the fault location. The bulging causes the CPC to significantly change in resistance and a fault can therefore be sensed by the control electronics.

The sensors of FIGS. 1, 2, 3, 4, and 5, as well as other configurations utilizing 3 layers of spatially constant cross-section, plus a protective layer, will all have constant capacitance per unit length depending on the design parameters. The instant invention provides means for sensing a fault by a comparison between (1) the unfaulted capacitance of the sensor and (2) the capacitance of the sensor under fault conditions. To accomplish this, the sensor is first excited when no fault exists, so that the full sensor capacitance is measured and stored by the control electronics. Subsequent excitations which measure a reduced capacitance means a fault exists. Comparison of the faulted and unfaulted capacitance values gives the fault location in one dimensional sensors and the fault area in two dimensional sensors. One excitation and measurement method is to charge the sensor from a DC power supply or battery. When the sensor reaches a present voltage the sensor is discharaged into a relatively large capacitor. The peak capacitor voltage is measured and converted either to a distance or an area. This value is displayed on a digital display. The large capacitor is then discharged and the cycle repeated. Only the active portion of the sensor will discharge into the large capacitor. The remainder of the sensor will remain isolated because at the fault, the solid conductive polymeric composition's resistance has risen many orders of magnitude above the base resistance.

FIG. 6 is a circuit diagram showing the essential charge/discharge components. Battery 26 charges the sensor (shown to be the cable in FIG. 2) through resistor 28. Capacitor 30 of capacitance C is initially uncharged, having been bled down through bleeder resistor 32. Prior to the cable reaching the full battery voltage of battery 26, four layer diode 34 breaks down at voltage $V_{4L}$. The cable discharges completely into capacitor 30 (overdamped due to resistance of the solid conductive polymeric composition layer 22) in a short time. Capacitor 30 cannot discharge in the reverse direction because of diode 36. The voltage V of capacitor 30 is measured. The participating sensing cable capacitance is: $CV/V_{4L}$. Knowing the capacitance per foot, the location of the fault is known and displayed. The display is updated every few seconds (each measurement cycle).

Measurement of the cable capacitance does not rely on propagating waves down the cable. Assuming that the base resistivity of the conductive polymeric composition is low enough to ensure uniform charging of the entire cable, then characteristic impedance is no longer an important parameter. This allows the use of existing conductive polymers in geometric forms such as flat strips, instead of coaxial cables. Overall cable resistance is not a critical parameter, allowing significant resistivity variations along the cable length due to wear, aging, splicing, or connectors.

The above circuit is but one of innumerable circuits which can be used to measure capacitance. Another such circuit utilizes circuitry which measures the time to charge the sensor cable by counting clock pulses. This circuit is shown in block diagram form in FIG. 7.

The sensor of the instant invention may be described as comprising an infinite number of resistance (R) and capacitance (C) sections. The sensor is connected as shown as the capacitance portion of a resistance (R)-capacitance (C) network of one half of a dual monostable multivibrator 40. The RC time constant thus formed determines the length of time that the monostable multivibrator 40 is in its "on" state. A signal from a constant-frequency clock generator 44 and the signal from the monostable multivbrator 40 are added in a NAND gate 46. The output of the NAND gate 46 is a burst of pulses, the number of which is determined by the "on" time of the monostable multivibrator 40. These pulses are counted by counter means 48 and displayed on suitable digital display means 52. The other half of the dual monostable multivibrator determines the "off" or discharge time between charging periods.

The circuit is initially adjusted to display a set of digits which correspond to the sensor's known length or area with no faults. When a fault occurs, the proportional decrease of capacitance is displayed as a lesser set of digits which correspond to the location or area of the fault.

FIG. 8 is a resistance versus temperature curve showing the steep increase of conductive polymer resistivity with temperature. Specifically, the resistivity increases over four orders of magnitude in less than 10° C.

EXAMPLE I

An over-temperature sensor was fabricated from a polyolefin based CPC having the following composition: 1633 g. (54 wt. percent) high density polyethylene ("Marlex" 6003 made by Phillips petroleum), 1331 g. (44 wt percent) carbon black ("Furnex" N765 made by Cities Services Co.) and 60.5 g (2 wt. percent) antioxidant (an oligomer of 4,4-thiobis (3-methyl-6-t-butyl phenol) with an average degree of polymerisation of 3 to 4, as described in U.S. Pat. No. 3,986,981). All materials were dried prior to compounding (50° C., 1 Torr for at least 16 hours). A Banbury mixer was preheated by fluxing high density polyethylene for 5 minutes. The composition ingredients were dry blended and introduced into the preheated, water cooled Banbury mixer. After mixing for 4.5 minutes in high gear, the composition was dumped, cooled to room temperature, granulated and dried (50° C., 1 Torr, 16 hours).

A temperature sensitive cable was made by extruding this composition using a 1" single screw extruder onto a 22 AWG single strand copper magnet wire, wherein the varnish insulation of the magnet wire provided the dielectric layer, to provide a final outside diameter of 0.100 inch. An insulating protective layer of high density polyethylene was then extruded onto the cable using standard extrusion techniques. The entire cable was then irradiated to 20 Mrads using a 1.0 MeV electron beam.

FIG. 8 is a plot of resistance versus temperature for the CPC composition of the cable, FIG. 8 being obtained by the following procedure.

Part of the granulated CPC mixture was compression molded at 180° C. at a pressure of 10,000 psi for 5 minutes into a slab about 0.040 inch thick. Rectangular samples 1.0×1.5 inch were cut from the slab and irradiated to 20 Mrads to cross link the composition. Silver electrodes were provided on the samples by painting 0.25×1.0 inch strips of silver-based composition (Electrodag 504) on each end of the samples to provide 1.0×1.0×0.040 inch samples. These samples were thermally conditioned by maintaining them at 160° C. for 15 minutes by external heating and then cooling to room temperature at the rate of 1° C. per minute. Resistance value as a function of temperature were measured at 3° C. intervals as the sample was heated between 20° and 165° C. at the rate of 3° C. per minute. The resistivity values were calculated from the actual resistance measurements. A log resistivity versus temperature curve for the conductive polymer of the preferred embodiment is shown in FIG. 8. As this plot indicates, the CPC material is in a "conductive state" at temperatures below 90° C. and dramatically changes to a "non-conductive state" at temperatures above 135° C.

EXAMPLE II

A hydrocarbon fluid sensor was prepared following the procedures outlined in Example I, utilizing the same CPC, protective layer material and construction. A twenty-five foot length of cable was attached to an electronic capacitance measuring device, having a circuit similar to that described in FIG. 7, and the relative capacitance of the cable measured. A hydrocarbon fluid fault was induced in the cable at approximately half the distance from the cable end, by immersing the cable into warm toluene. The capacitance of the faulted cable was measured and compared with the non-faulted capacitance measurement. The cable provided approximately one-half the measured capacitance value.

In an idealized sensor, the base resistivity of the CPC is very low. Sensors of long length or great area can then be charged and discharged in short times (less than a second) without substantial voltage drop in the CPC. Practical (existing) CPC's have higher than ideal base resistivities. Ensuring that a substantial voltage drop does not occur in the CPC means a trade-off is required between CPC spatial extent, CPC cross-sectional area, and the charge/discharge time. It should be noted especially that increasing the CPC cross-sectional area decreases the resistance per unit length, and this technique is a suitable means to achieve a low resistance CPC layer with non-ideal materials.

From the foregoing detailed description, it is evident that there are a number of changes, adaptations, and modifications of the present invention which come within the province of those skilled in the art. However, it is intended that all such variations not departing from the spirit of the invention, be considered as within the scope thereof as limited solely by the appended claims.

What is claimed is:

1. A liquid fluid fault detecting and locating sensor comprising:
   (a) an electrical conductor, said conductor selectively connectable to a capacitance measuring device;
   (b) a dielectric material in contact with said electrical conductor;
   (c) a solid conductive polymeric composition having conductive particles therein in contact with said dielectric material and separated from said electrical conductor by said dielectric material, said solid conductive polymeric composition being normally conductive and being capable of a massive increase in resistivity upon exposure to a liquid fluid fault condition at any location along said solid conductive polymeric composition where a fault condition occurs, the solid conductive polymeric composition capable of swelling when exposed to liquid fluid resulting in separation of the conductive particles causing a resultant massive increase in resistance, said solid polymeric composition selectively connectable to a capacitance measuring device so that the capacitance between said electrical conductor and said solid conductive polymeric composition is measurable before and during exposure to a fluid fault condition, the ratio of said capacitance measurements determining the location of a liquid fault condition.

2. A sensor as in claim 1 wherein said dielectric material is mounted coaxially about said electrical conductor and said solid conductive polymeric composition is mounted coaxially about said dielectric material to form a generally coaxially cable construction.

3. A sensor as in claim 2 wherein a protective layer is mounted coaxially about said solid conductive polymeric composition.

4. A sensor as in claim 1 wherein said electrical conductor, said dielectric material and said solid conductive polymeric composition are elongated flat layers to form a generally flat sensor construction.

5. A sensor as in claim 4 wherein a protective layer which is permeable to a fluid is mounted around the perimeter of said sensor.

6. A liquid fluid fault detecting and locating device comprising:
   (a) an electrical conductor;
   (b) a dielectric material in contact with said electrical conductor;
   (c) a solid conductive polymeric composition having conductive particles therein in contact with said dielectric material and separated from said electrical conductor by said dielectric material, said solid conductive polymeric composition being normally conductive and being capable of a massive increase in resistivity upon exposure to a liquid fluid fault condition at any location along said solid conductive polymeric composition where a fluid fault condition occurs, the solid conductive polymeric composition capable of swelling when exposed to a liquid fluid resulting in separation of the conductive particles causing a resultant massive increase in resistance; and
   (d) means for sensing said location of a fluid fault condition, said means electrically connected to said electrical conductor and said solid conductive polymeric composition, said means comprising means for measuring and comparing the electrical capacitances between said electrical conductor and said solid conductive polymeric composition before and during exposure to a liquid fluid fault condition, the ratio of said capacitance measurements determining the location of a liquid fault condition.

7. A device as in claim 6 wherein said dielectric material is mounted coaxially about said electrical conductor and said solid conductive polymeric composition is mounted coaxially about said dielectric material to form a generally coaxial cable construction.

8. A device as in claim 7 wherein a protective layer is mounted coaxially over said solid conductive polymeric composition.

9. A device as in claim 8 wherein said protective layer is permeable to a fluid.

10. A device as in claim 6 wherein said electrical conductor, said dielectric material and said solid conductive polymeric composition are elongated flat layers to form a generally flat sensor construction.

11. A device as in claim 10 wherein a protective layer which is permeable to a fluid is mounted around the perimeter of said flat sensor construction.

12. A hydrocarbon fluid fault detecting and locating sensor comprising:
 (a) an electrical conductor, said conductor selectively connectable to a capacitance measuring device;
 (b) a dielectric material in contact with said electrical conductor;
 (c) a solid conductive polymeric composition having conductive particles therein in contact with said dielectric material and separated from said electrical conductor by said dielectric material, said solid conductive polymeric composition being normally conductive and being capable of massive increase in resistivity upon exposure to a hydrocarbon fluid fault condition at any location along said solid conductive polymeric composition where a fault condition occurs, the solid conductive polymeric composition capable of swelling when exposed to a hydrocarbon fluid resulting in separation of the conductive particles causing the resultant massive increase in resistance, said solid polymeric composition selectively connectable to a capacitance measuring device so that the capacitance between the electrical conductor and said solid conductive polymeric composition is measurable before and during exposure to a hydrocarbon fluid fault condition, the ratio of said capacitance measurements determining the location of a hydrocarbon liquid fault condition.

13. A device as in claim 12 wherein the conductive polymeric composition is a polyolefin-based conductive polymeric composition.

14. A hydrocarbon fluid fault detecting and locating device comprising:
 (a) an electrical conductor;
 (b) a dielectric material in contact with said electrical conductor;
 (c) a solid conductive polymeric composition havng conductive particles therein in contact with said dielectric material and separated from said electrical conductor by said dielectric material, said solid conductive polymeric composition being normally conductive and being capable of a massive increase in resistivity upon exposure to a hydrocarbon fluid fault condition at any location along said solid conductive polymeric composition where a hydrocarbon fluid fault condition occurs, the solid conductive polymeric composition capable of swelling when exposed to a liquid fluid resulting in separation of the conductive particles causing a resultant massive increase in resistance; and
 (d) means for sensing the location of said hydrocarbon fluid fault condition, said means electrically connected to said electrical conductor and to said solid conductive polymeric composition, said means comprising means for measuring and comparing the electrical capacitances between said electrical conductor and said solid conductive polymeric composition before and during exposure to a hydrocarbon fluid fault condition, the ratio of said capacitance measurements determining the location of a hydrocarbon liquid fault condition.

15. A device as in claim 14 wherein the conductive polymeric composition is a polyolefin-based conductive polymeric composition.

16. A pressure fault detecting and locating sensor for pressurized cables comprising:
 (a) an electrical conductor, said conductor selectively connectable to a capacitance measuring device;
 (b) a dielectric material in contact with said electrical conductor; and
 (c) a solid conductive polymeric composition in contact with said dielectric material and separated from said electrical conductor by said dielectric material material, said solid conductive polymeric composition having conductive particles and being normally conductive and being capable of a massive increase in resistivity upon exposure to a pressure change fault condition at any location along said solid conductive polymeric composition where said pressure fault condition occurs, said pressure fault causing stretching of the composition and resultant separation of conductive particles resulting in a massive increase in resistance, said solid polymeric composition selectively connectable to a capacitance measuring device so that the capacitance between said electrical conductor and said solid conductive polymeric composition is measurable before and during exposure to the pressure fault condition, the ratio of said capacitance measurements determining the location of said pressure fault condition.

17. A pressure fault detecting and locating device for pressurized cables comprising:
 (a) an electrical conductor;
 (b) a dielectric material in contact with said electrical conductor;
 (c) a solid conductive polymeric composition in contact with said dielectric material and separated from said electrical conductor by said dielectric material, said solid conductive polymeric composition having conductive particles and being normally conductive and being capable of a massive increase in resistivity upon exposure to a pressure change fault condition at any location along said solid conductive polymeric composition where said pressure fault condition occurs, said pressure fault causing stretching and resultant separation of conductive particles resulting in a massive increase in resistance; and
 (d) means for sensing said location of said pressure fault condition, said means electrically connected to said electrical conductor and said solid conductive polymeric composition, said means comprising means for measuring and comparing the electrical capacitances between said electrical conductor and said solid conductive polymeric composition before and during exposure to said pressure fault condition, the ratio of said capacitance measurements determining the location of said pressure fault condition.

* * * * *